United States Patent
Harnik et al.

(10) Patent No.: US 10,169,364 B2
(45) Date of Patent: Jan. 1, 2019

(54) GAUGING ACCURACY OF SAMPLING-BASED DISTINCT ELEMENT ESTIMATION

(71) Applicant: International Business Machines Corporation, Armonk, NY (US)

(72) Inventors: Danny Harnik, Tel Mond (IL); Ety Khaitzin, Holon (IL); Dmitry Sotnikov, Rishon-Lezion (IL)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 14/994,160

(22) Filed: Jan. 13, 2016

(65) Prior Publication Data
US 2017/0199892 A1 Jul. 13, 2017

(51) Int. Cl.
*G06F 17/30* (2006.01)

(52) U.S. Cl.
CPC .... *G06F 17/30156* (2013.01); *G06F 17/3033* (2013.01); *G06F 17/30489* (2013.01)

(58) Field of Classification Search
None
See application file for complete search history.

(56) References Cited

U.S. PATENT DOCUMENTS

| 5,668,897 A * | 9/1997 | Stolfo | G06F 17/30247 382/283 |
| 8,392,434 B1 | 3/2013 | Woodruff et al. | |
| 9,152,333 B1 | 10/2015 | Johnston et al. | |
| 2004/0059743 A1* | 3/2004 | Burger | G06F 17/30536 |
| 2007/0283338 A1* | 12/2007 | Gupta | G06F 11/36 717/154 |
| 2008/0306903 A1 | 12/2008 | Larson et al. | |
| 2010/0088315 A1* | 4/2010 | Netz | G06F 17/30501 707/737 |
| 2010/0169252 A1 | 7/2010 | Fan et al. | |

(Continued)

OTHER PUBLICATIONS

Jacek Cichon et al., "Two-phase cardinality estimation protocols for sensor networks with provable precision", Wireless Communications and Networking Conference (WCNC), 2012 IEEE, Date of Conference: Apr. 1-4, 2012, pp. 2009-2013.

(Continued)

*Primary Examiner* — Wilson Lee
(74) *Attorney, Agent, or Firm* — Daniel Kligler (57) ABSTRACT

A method, including identifying, using a sampling ratio, a random number of logical data units. A hash is calculated for each of the identified logical data units, and a first histogram is computed indicating a duplication count of each of the calculated hashes. Based on respective frequencies of the calculated hashes, a second histogram is computed indicating observed frequencies of each of the duplication counts in the first histogram, and based on the sampling ratio and the second histogram, a target function is derived. A range of acceptable results is derived for the target function, and based on the range of the acceptable results, a set of plausible duplication frequency histograms is defined. A first given plausible duplication frequency histogram having a highest number of distinct logical data units is identified, and a second given plausible duplication frequency histogram having a lowest number of distinct logical data units is identified.

15 Claims, 2 Drawing Sheets

(56) References Cited

U.S. PATENT DOCUMENTS

2011/0313979 A1* 12/2011 Roberts .............. G06F 17/3051
                                                        707/690
2014/0052699 A1    2/2014 Harnik et al.
2015/0356123 A1* 12/2015 Gorelik ............. G06F 17/30297
                                                        715/765
2016/0239528 A1*  8/2016 Pemberton ........ G06F 17/30536

OTHER PUBLICATIONS

Danny Harnik et al., "Estimation of Deduplication Ratios in Large Data Sets", Mass Storage Systems and Technologies (MSST), pp. 1-11, 2012 IEEE 28th.

* cited by examiner

GAUGING ACCURACY OF SAMPLING-BASED DISTINCT ELEMENT ESTIMATION

CROSS-REFERENCE TO RELATED APPLICATIONS

This application is related to U.S. patent applications titled "Low Memory Sampling Based Estimation of Distinct Elements and Deduplication" and "Sampling-Based Deduplication Estimation" filed on even date with the present application, and which are incorporated herein by reference.

FIELD OF THE INVENTION

The present invention relates generally to distinct element estimation, and specifically to implementing a method of gauging an accuracy of a distinct logical data unit estimation derived from a random sample of logical data units retrieved from a storage system.

BACKGROUND

Estimating a number of distinct elements in a large dataset has uses in many disciplines including biology, database analysis and "big data" analysis. For example, the elements might represent IP addresses of packets passing through a router, unique visitors to a web site, elements in a large database, motifs in a DNA sequence, or elements of RFID/sensor networks. In operation, estimating a number of distinct elements in a dataset can be used to estimate a deduplication rate for the dataset.

The description above is presented as a general overview of related art in this field and should not be construed as an admission that any of the information it contains constitutes prior art against the present patent application.

SUMMARY

There is provided, in accordance with an embodiment of the present invention a method, including selecting a sampling ratio, identifying, using the selected sampling ratio, a random number of a plurality of logical data units, calculating a hash value for each of the identified logical data units, computing a first histogram indicating a duplication count of each of the calculated hash values, computing, based on respective frequencies of the calculated hash values, a second histogram indicating observed frequencies of each of the duplication counts in the first histogram, deriving, based on the sampling ratio and the second histogram, a target function, defining a range of acceptable results for the target function, defining, based on the range of the acceptable results, a set of plausible duplication frequency histograms, identifying a first given plausible duplication frequency histogram having a highest number of distinct logical data units, and identifying a second given plausible duplication frequency histogram having a lowest number of distinct logical data units.

There is also provided, in accordance with an embodiment of the present invention an apparatus, including one or more storage devices configured to store a plurality of logical data units, and a processor configured to select a sampling ratio, to identify, using the selected sampling ratio, a random number of a plurality of the logical data units, to calculate a hash value for each of the identified logical data units, to compute a first histogram indicating a duplication count of each of the calculated hash values, to compute, based on respective frequencies of the calculated hash values, a second histogram indicating observed frequencies of each of the duplication counts in the first histogram, to derive, based on the sampling ratio and the second histogram, a target function, to define a range of acceptable results for the target function, to define, based on the range of the acceptable results, a set of plausible duplication frequency histograms, to identify a first given plausible duplication frequency histogram having a highest number of distinct logical data units, and to identify a second given plausible duplication frequency histogram having a lowest number of distinct logical data units.

There is further provided, in accordance with an embodiment of the present invention a computer program product, the computer program product including a non-transitory computer readable storage medium having computer readable program code embodied therewith, the computer readable program code including computer readable program code configured to select a sampling ratio, computer readable program code configured to identify, using the selected sampling ratio, a random number of a plurality of logical data units, computer readable program code configured to calculate a hash value for each of the identified logical data units, computer readable program code configured to compute a first histogram indicating a duplication count of each of the calculated hash values, computer readable program code configured to compute, based on respective frequencies of the calculated hash values, a second histogram indicating observed frequencies of each of the duplication counts in the first histogram, computer readable program code configured to derive, based on the sampling ratio and the second histogram, a target function, computer readable program code configured to define a range of acceptable results for the target function, computer readable program code configured to define, based on the range of the acceptable results, a set of plausible duplication frequency histograms, computer readable program code configured to identify a first given plausible duplication frequency histogram having a highest number of distinct logical data units, and computer readable program code configured to identify a second given plausible duplication frequency histogram having a lowest number of distinct logical data units.

BRIEF DESCRIPTION OF THE DRAWINGS

The disclosure is herein described, by way of example only, with reference to the accompanying drawings, wherein.

DETAILED DESCRIPTION OF EMBODIMENTS

U.S. patent application entitled "Sampling-Based Deduplication Estimation", referenced above, describes a method for to estimate the deduplication ratio an entire dataset based on a sample of the dataset. Embodiments of the present invention provide methods and systems for gauging an accuracy of an estimate of a number of distinct logical data units (and a corresponding deduplication rate) derived from a random sample of data retrieved from a storage system.

As described hereinbelow, a sampling ratio is selected, and using the selected sampling ratio, a random number of a plurality of logical data units are selected. A hash value for each of the identified logical data units is calculated, and a first histogram indicating a duplication count of each of the calculated hash values is computed. Based on respective frequencies of the calculated hash values, a second histogram indicating observed frequencies of each of the duplication counts in the first histogram is computed, and based on the sampling ratio and the second histogram, a target function is derived. A range of acceptable results for the target function is defined, and based on the range of the acceptable results, a set of plausible duplication frequency histograms is defined. A first given plausible duplication frequency histogram having a highest number of distinct logical data units is identified, and a second given plausible duplication frequency histogram having a lowest number of distinct logical data units is identified.

Rather than estimating a number of distinct logical data units, systems implementing embodiments of the present invention can generate a range estimate for the number of distinct logical data units in a storage system. The goal is to generate a given range for a number of distinct logical data units in a storage system such that, with very high probability, the actual number of distinct logical data units in the storage system is within the given range.

In operation, embodiments of the present invention use embodiments described in U.S. patent application entitled "Sampling-Based Deduplication Estimation", referenced above, to estimate a deduplication ratio in a given storage system. As described in the referenced patent application, the deduplication rate can be estimated by identifying the random sample of logical data units, computing the first and the second observed histograms of the sample, deriving a target function, and then performing an optimization process that finds the third histogram (i.e., a given plausible duplication frequency histogram) that minimizes this target function. The third histogram comprises an "optimal histogram" from which the estimate of the number of distinct logical data units can be derived.

Embodiments described herein add the following optimization steps to the estimation method to the U.S. patent application entitled, "Sampling-Based Deduplication Estimation", referenced above:

1. Derive a first given third histogram having the smallest number of distinct logical data units under the constraint that the target function on this histogram is up to ε more than the target function on the optimal histogram.
2. Derive a second given third histogram having the largest number of distinct logical data units under the constraint that the target function on this histogram is up to ε more than the target function on the optimal histogram.

The results of these two optimization processes indicate a range comprising upper and lower bounds on the number of distinct logical data units given the specific sample. Given this range, a user can collect a new set of samples, and add to the existing samples if the upper and the lower bounds are not tight enough for the user's requirements.

System Description

Figure 1:
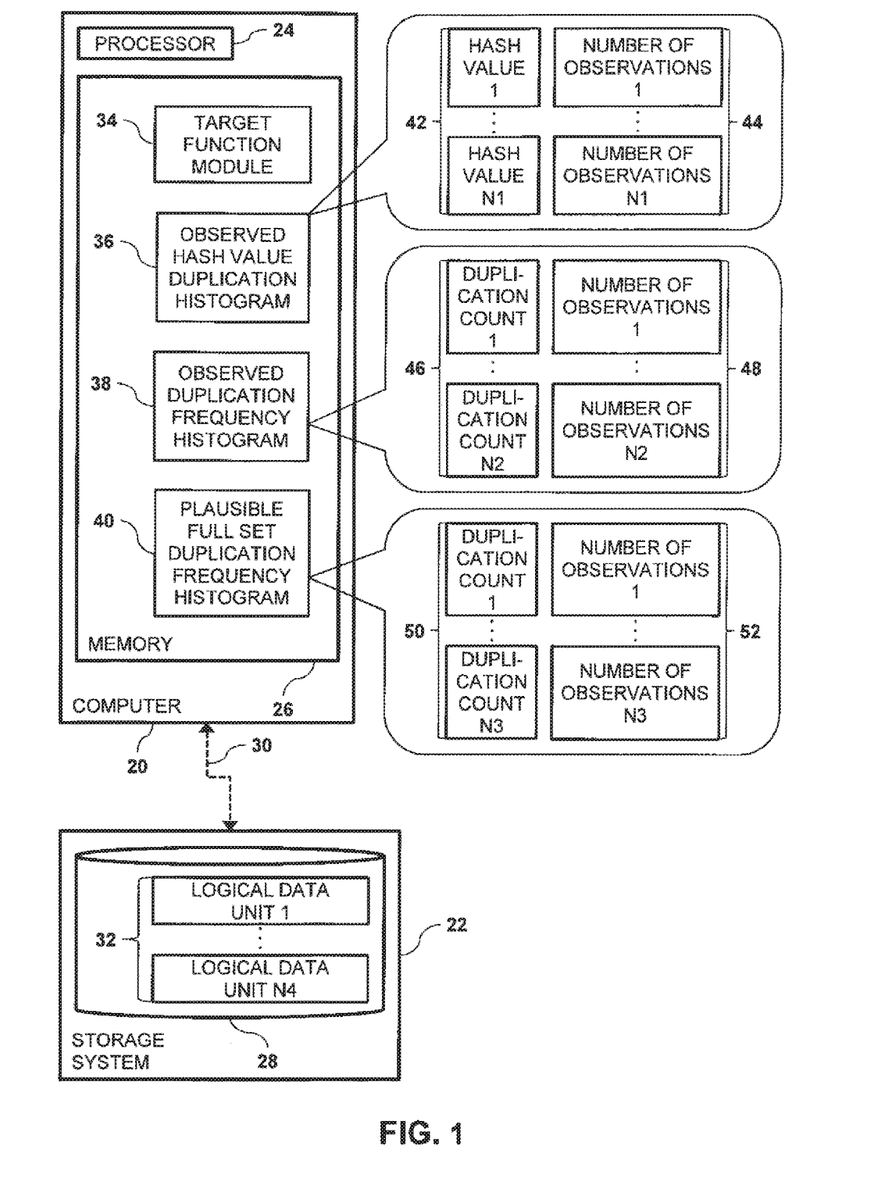
FIG. 1 is a block diagram that schematically illustrates a computer system configured to gauge an accuracy of a distinct logical data unit estimation, in accordance with an embodiment of the present invention.

FIG. 1 is a block diagram that schematically illustrates a computer 20 configured to estimate a deduplication ratio for data stored on a storage system 22 in accordance with an embodiment of the present invention. Computer 20 comprises a processor 24 and a memory 26, and storage system 22 comprises one or more storage devices 28 such as hard disk drives or solid-state disk drives. Computer 20 and storage system 22 communicate via a data network connection 30.

In operation, storage system 22 stores data in logical data units 32 on storage device 28. While the configuration in FIG. 1 presents storage device 28 comprising logical data units 32, storage system 22 comprising any type of logical data units that can be analyzed for deduplication is considered to be within the spirit and scope of the present invention. Examples of logical data units that computer 20 can analyzed for deduplication include block logical data units, file system logical data units and object logical data units.

Memory 26 stores a target function module 34, an observed hash value duplication histogram 36, an observed duplication frequency histogram 38 and an plausible full set duplication frequency histogram 40. In some embodiments, as described hereinbelow, processor 24 may store a set of plausible full set duplication frequency histograms 40 in memory 26.

In embodiments described herein, each histogram 36, 38 and comprises (i.e., in a more general mathematical sense) a function $m_i$ that counts the number of observations that fall into each of the disjoint categories (known as bins). Therefore, if we let n be the total number of observations and k be the total number of bins, the histogram $m_i$ meets the following conditions:

$$n = \sum_{i=1}^{k} m_i. \qquad (1)$$

In embodiments described herein, observed hash value duplication histogram 36 may also be referred to as a first histogram, plausible full set duplication frequency histogram 38 may also be referred to as a second histogram and derived plausible full set duplication frequency histogram 40 may also be referred to as a third histogram or a target histogram. In embodiments described herein, processor 24 typically derives multiple (typically two or three) instances of plausible full set duplication frequency histogram 40 when gauging an accuracy of an estimate of a number of distinct logical data units 32. As described hereinbelow:

Processor 24 first retrieves a sample number of logical data units 32, calculates a hash value 42 for each of the logical data units, and creates observed hash value duplication histogram 36. In observed hash value duplication histogram 36, each given hash value 42 has an associated number of observations 44 indicating a number of logical data units 32 that have the given hash value.

Processor 24 analyzes observed hash value duplication histogram 36 to create observed duplication frequency histogram 38 comprising duplication counts 46 and corresponding number of observations 48. Each duplication count 46 indicates a number of duplications (i.e., observed frequency histogram 38 comprises observed frequencies of duplication counts 46). For example, a given duplication count 46 stores "5" and its corresponding number of observations 48 stores "8" indicates that there are eight instances in the sample number of logical data units 32 where a given logical data unit 32 is duplicated five times.

Processor 24 executes target function module 34 to derive a target function comprising a transformation function.

Processor 24 derives multiple instances of plausible full set duplication frequency histogram 40, the duplication frequency histograms comprising respective duplication counts 50 and a corresponding respective number of observations 52. In embodiments of the present invention, each plausible full set duplication frequency histogram 40 comprises a duplication frequency histogram for the entire dataset (i.e., all logical data units 32 in storage system 22) that "best explains" observed duplication frequency histogram 40.

While embodiments herein use hash values 42 to identify duplicate logical data units 32, any other type of digital "fingerprint" that can identify the duplicate logical data units is considered to be within the spirit and scope of the present invention. In some embodiments, each given hash value 42 may have a corresponding compression ratio (not shown) or an estimated compression ratio (not shown) for the logical data unit associated with the given hash value. Incorporating compression ratios or estimated compression ratios into identifying space savings realized from deduplication is described hereinbelow.

Memory 26 typically comprises high-speed volatile memory such as random access memory (RAM). While the example in FIG. 1 shows histograms 36, 38 and 40 stored entirely in memory 26, other configurations are considered to be within the spirit and scope of the present invention. For example, histograms 36, 38 and 40 can be stored on storage device (not shown) coupled to computer 20, or the histograms can stored using a combination of memory 26 and the storage device.

Processor 24 typically comprises a general-purpose computer, which are programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 24 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Deduplication Range Estimation

Figure 2:
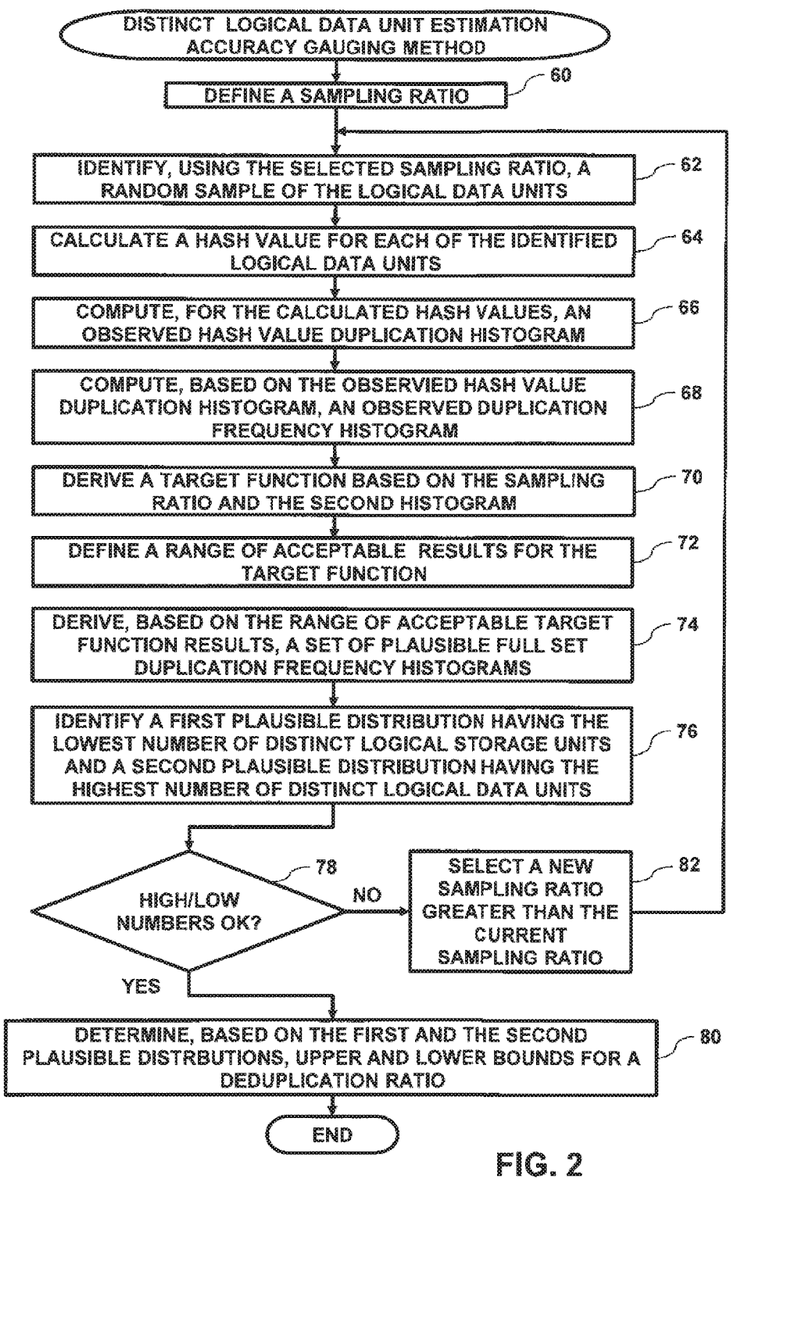
FIG. 2 is a flow diagram that schematically illustrates a method for gauging the accuracy of the distinct logical data unit estimation, in accordance with an embodiment of the present invention.

FIG. 2 is a flow diagram that schematically illustrates a method for gauging the accuracy of an estimate of a number of distinct elements in a set, in accordance with an embodiment of the present invention. In embodiments described herein, the set comprises logical data units in storage system 22, and the distinct elements comprise distinct logical data units in the storage system. As described hereinbelow, an accuracy of an estimate of a deduplication rate can also be gauged using embodiments described herein In a definition step 60, a sampling ratio (e.g., 1%) is defined, and in an identification step 62, processor 24 uses the sampling ratio to select a random sample of logical data units (also referred to herein as a plurality of logical data units 32). In a calculation step 64, processor 24 calculates a hash value for each of the identified logical data units, and in a first computation step 66, the processor computes observed hash value histogram 36 indicating respective duplication frequencies of on the calculated hash values. In a second computation step 68, processor 24 computes observed frequency histogram 38 based on observed hash value histogram 36. In embodiments described herein, processor 24 selects a random sample of size m out of the entire data set of size N, and computes a duplication frequency histogram y (i.e., histogram 38) on this sample.

In a first derivation step 70, processor 24 derives a target function based on the sampling ratio and observed frequency histogram 38. In some embodiments, processor 24 derives a sampling transform T between a duplication frequency histogram x' on a dataset of total size N to the expected duplication frequency histogram y' of a random sample of size m (randomly chosen out of the full sized N data set). The target function on x' is then defined as the distance between T(x') and the observed histogram y.

In a definition step 72, processor 24 defines a range of acceptable results for the target function, and in a second derivation step 74, the processor derives based on the range of acceptable target function results, a set of plausible full set frequency histograms 40. In an identification step 24, processor 24 identifies a first given plausible frequency histogram having the lowest number of distinct logical data units, and identifies a second given plausible frequency histogram having the highest number of distinct logical data units (i.e., the lowest and the highest in the set). When identifying the first and the second given plausible frequency histograms, processor 24 can use calculations such as linear programming computations, maximum likelihood computations and quadratic programming computations.

In some embodiments, processor 24 can derive, for all the logical data units in storage system 22, a given optimal duplication frequency histogram 40 for the plurality of the logical data units in storage system 22 that minimizes target function. When deriving optimal duplication frequency histogram 40, processor 24 can use calculations such as quadratic programming computations, maximum likelihood computations and linear programming computations. Deriving the target function and optimal duplication frequency histogram 40 is described in U.S. patent application entitled, "Sampling-Based Deduplication Estimation" referenced above.

When deriving optimal duplication frequency histogram 40, the objective is to find a legal duplication frequency histogram x' such that the distance between T(x') and the observed y is minimal. The deduplication estimation of the data set can then be computed according to the optimal x'.

More formally, given an observed duplication frequency histogram y, the objective of embodiments of the present invention is to find a legal duplication frequency histogram x' for which $$\sum_{i=1}^{size\,(x')} i*x'_i = N \qquad (2)$$

that minimizes the distance (i.e., the target function):

$$\text{Dist}(T(x'),y). \qquad (3)$$

The estimated number of distinct logical data units 32 in the entire data set is then $$C = \sum_{i=1}^{size\,(x')} x'_i \qquad (4)$$

the result forms the optimal duplication frequency histogram and the value of the target function on this histogram can be denoted by Opt=Dist(T(x'),y).

Upon deriving optimal duplication frequency histogram 40 with an optimal target function value, processor 24 can apply a bounding factor to the optimal target function value Opt in order to identify the range of plausible target function values. The bounding factor may comprise a result of a bounding function calculated with parameters comprising the target function and derived duplication frequency histogram 40.

In some embodiments, processor 24 can perform the following two optimization steps:
1. Find a duplication frequency histogram x" that minimizes $$C'' = \sum_{i=1}^{size(x')} x_i' \quad (5)$$

under the restriction that $$\sum_{i=1}^{size(x')} i * x_i' = N \quad (6)$$

and that Dist(T(x"),y)<Opt+ε. Let C" be the lower boundary of the range for the estimated number of distinct logical data units 32.
2. Find a duplication frequency histogram x''' that maximizes $$C''' = \sum_{i=1}^{size(x')} x_i' \quad (7)$$

under the restriction that $$\sum_{i=1}^{size(x')} i * x_i' = N \quad (8)$$

and that Dist(T(x"),y)<Opt+ε. Let C''' be the lower boundary of the range for the estimated number of distinct logical data units 32.

This two-step optimization process can be done naturally under using linear programming if the distance measure is an $l_1$ norm. Additionally, the parameter ε can be increased to allow a safer yet larger boundary, or decreased to get a more aggressive and tighter estimation (albeit at a higher risk of the actual vale falling out of the correct range).

In some embodiments, processor 24 can identify a range of feasible distances Dist(T(x'),y). In this case, processor 24 can forgo the initial optimization and run the second and third optimizations with the constraint that Dist(T(x"),y) and Dist(T(x"),y) are inside the aforementioned range.

Returning to the flow diagram, in a decision step 78, if, from the first and the second plausible full set duplication frequency histograms, the lowest and the highest numbers of distinct logical data units 32 comprise an acceptable range, then in a determination step 80, processor 24 determines upper and lower bounds for a deduplication rate based on the lowest and the highest numbers of distinct logical data units 32, and the method ends.

Returning to step 78, if the lowest and the highest numbers of distinct logical data units 32 do not comprise an acceptable range, then in a third selection step 82, processor 24 selects a new sampling ratio greater than the sampling ratio that was last used in step 62, and the method continues with step 62. In some embodiments processor 24 can retain the existing random sample when increasing the sample size. For example, if a first pass of the analysis used a 1% sample size and the second pass uses a 5% sample size, processor 24 can (i.e., in step 62) retrieve a 4% random sample that does not overlap with the 1% sample and combine the 4% sample with the 1% sample.

In an alternative embodiment, processor 24 can reverse steps 78 and 80. In other words, processor 24 can determine the upper and the lower bounds for the deduplication rate, and then perform the comparison step based on the upper and the lower bounds for the deduplication rate. For example, if the goal of an analysis using embodiments of the present invention is to determine if the deduplication rate is at least 50%, and the upper and lower bounds of the deduplication rate is respectively 30% and 80%, and current sampling rate is 1%, then processor 24 can increase the sampling ratio to 5% in step 82 and continue with step 62. If the 5% sampling rate results in a determined deduplication range of 55%-75%, then the deduplication rate for storage system 22 has a very high probability of being greater than 50%, and no additional samples need to be analyzed.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for estimating deduplication rate of logical data units retrieved from a storage system, comprising:
selecting a sampling ratio, and sampling a plurality of logical data units from the storage system in accordance with the sampling ratio;
calculating a hash value for each of the sampled logical data units;
computing a first histogram indicating a duplication count of each of the calculated hash values;
computing, based on respective frequencies of the calculated hash values, a second histogram indicating observed frequencies of each of the duplication counts in the first histogram;
deriving, based on the sampling ratio and the second histogram, a target function;
defining a range of acceptable results for the target function;

defining, based on the range of the acceptable results, a set of plausible duplication frequency histograms;

identifying a first given plausible duplication frequency histogram having a highest number of distinct logical data units;

identifying a second given plausible duplication frequency histogram having a lowest number of distinct logical data units; and determining, from the first and the second given plausible duplication frequency histogram, an upper and a lower bounds for a deduplication rate of the logical data units.

2. The method according to claim 1, wherein defining the set of the plausible duplication frequency histograms comprises deriving a third histogram that minimizes the target function, the third histogram comprising an optimal histogram of the plurality of the logical data units.

3. The method according to claim 2, wherein defining the range of acceptable results for the target function comprises defining a bounding factor comprising a result of a bounding function calculated with parameters comprising the target function and the third histogram.

4. The method according to claim 1, wherein identifying the first and the second plausible duplication frequency histograms comprises computing a calculation selected from a group consisting of a quadratic programming computation, a maximum likelihood computation and a linear programming computation.

5. The method according to claim 1, wherein the sampling ratio comprises a first sampling ratio, and comprising upon detecting that the range of deduplication rates exceeds a defined range, selecting a second sampling ratio greater than the first ratio, and repeating, using the selected second sampling ratio, the steps of sampling the plurality number of logical data units, calculating the hash value, computing the first histogram, computing the second histogram, deriving the target function, defining the range of acceptable results, defining the set of plausible duplication frequency histogram, identifying the first and the second given plausible duplication frequency histograms, and determining the upper and the lower bounds for a deduplication rate of the logical data units.

6. An apparatus for estimating deduplication rate of logical data units retrieved from one or more storage devices, comprising:

one or more storage devices configured to store a plurality of logical data units; and a processor configured:
to select a sampling ratio, and to sample a plurality of logical data units from the one or more storage devices in accordance with the sampling ratio,
to calculate a hash value for each of the sampled logical data units,
to compute a first histogram indicating a duplication count of each of the calculated hash values,
to compute, based on respective frequencies of the calculated hash values, a second histogram indicating observed frequencies of each of the duplication counts in the first histogram,
to derive, based on the sampling ratio and the second histogram, a target function,
to define a range of acceptable results for the target function,
to define, based on the range of the acceptable results, a set of plausible duplication frequency histograms,
to identify a first given plausible duplication frequency histogram having a highest number of distinct logical data units,
to identify a second given plausible duplication frequency histogram having a lowest number of distinct logical data units, and
to determine, from the first and the second given plausible duplication frequency histogram, an upper and a lower bounds for a deduplication rate of the logical data units.

7. The apparatus according to claim 6, wherein the processor is configured to define the set of the plausible duplication frequency histograms by deriving a third histogram that minimizes the target function, the third histogram comprising an optimal histogram of the plurality of the logical data units.

8. The apparatus according to claim 7, wherein the processor is configured to define the range of acceptable results for the target function by defining a bounding factor comprising a result of a bounding function calculated with parameters comprising the target function and the third histogram.

9. The apparatus according to claim 6, wherein the processor is configured to identifying the first and the second plausible duplication frequency histograms by computing a calculation selected from a group consisting of a quadratic programming computation, a maximum likelihood computation and a linear programming computation.

10. The apparatus according to claim 6, wherein the sampling ratio comprises a first sampling ratio, and wherein upon detecting that the range of deduplication rates exceeds a defined range, the processor is configured to select a second sampling ratio greater than the first ratio, and to repeat, using the selected second sampling ratio, the steps of sampling the plurality of logical data units, calculating the hash value, computing the first histogram, computing the second histogram, deriving the target function, defining the range of acceptable results, defining the set of plausible duplication frequency histogram, identifying the first and the second given plausible duplication frequency histograms, and determining the upper and the lower bounds for a deduplication rate of the logical data units.

11. A computer program product for estimating deduplication rate of logical data units retrieved from a storage system, the computer program product comprising:

a non-transitory computer readable storage medium having computer readable program code embodied therewith, the computer readable program code comprising:

computer readable program code configured to select a sampling ratio, and to sample a plurality of logical data units from the storage system in accordance with the sampling ratio;

computer readable program code configured to calculate a hash value for each of the plurality of sampled logical data units;

computer readable program code configured to compute a first histogram indicating a duplication count of each of the calculated hash values;

computer readable program code configured to compute, based on respective frequencies of the calculated hash values, a second histogram indicating observed frequencies of each of the duplication counts in the first histogram;

computer readable program code configured to derive, based on the sampling ratio and the second histogram, a target function;

computer readable program code configured to define a range of acceptable results for the target function;

computer readable program code configured to define, based on the range of the acceptable results, a set of plausible duplication frequency histograms;

computer readable program code configured to identify a first given plausible duplication frequency histogram having a highest number of distinct logical data units;

computer readable program code configured to identify a second given plausible duplication frequency histogram having a lowest number of distinct logical data units; and computer readable program code configured to determine, from the first given plausible duplication frequency histogram having a highest number of distinct logical data units and from the second given plausible duplication frequency histogram having a lowest number of distinct logical data units, an upper and a lower bounds for a deduplication rate of the logical data units.

12. The computer program product according to claim 11, wherein the computer readable program code is configured to define the set of the plausible duplication frequency histograms by deriving a third histogram that minimizes the target function, the third histogram comprising an optimal histogram of the plurality of the logical data units.

13. The computer program product according to claim 12, wherein the computer readable program code is configured to define the range of acceptable results for the target function by defining a bounding factor comprising a result of a bounding function calculated with parameters comprising the target function and the third histogram.

14. The computer program product according to claim 11, wherein the computer readable program code is configured to identify the first and the second plausible duplication frequency histograms by computing a calculation selected from a group consisting of a quadratic programming computation, a maximum likelihood computation and a linear programming computation.

15. The computer program product according to claim 11, wherein the sampling ratio comprises a first sampling ratio, and comprising computer readable program code configured, upon detecting that the range of deduplication rates exceeds a defined range, to select a second sampling ratio greater than the first ratio, and to repeat, using the selected second sampling ratio, the steps of sampling the plurality of logical data units, calculating the hash value, computing the first histogram, computing the second histogram, deriving the target function, defining the range of acceptable results, defining the set of plausible duplication frequency histogram, identifying the first and the second given plausible duplication frequency histograms, and determining the upper and the lower bounds for a deduplication rate of the logical data units.

* * * * *